US010609350B1

(12) United States Patent
Brailovskiy et al.

(10) Patent No.: US 10,609,350 B1
(45) Date of Patent: Mar. 31, 2020

(54) MULTIPLE FREQUENCY BAND IMAGE DISPLAY SYSTEM

(71) Applicant: Amazon Technologies, Inc., Seattle, WA (US)

(72) Inventors: Ilya Vladimirovich Brailovskiy, Mountain View, CA (US); Eric Gifford Marason, San Francisco, CA (US); Evangelos Pappas-Katsiafas, Cambridge (GB); Ali Shahrokni, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 41 days.

(21) Appl. No.: 15/401,942

(22) Filed: Jan. 9, 2017

(51) Int. Cl.
| | |
|---|---|
| *H04N 9/31* | (2006.01) |
| *G06T 5/20* | (2006.01) |
| *H04N 5/33* | (2006.01) |
| *G06T 7/50* | (2017.01) |

(52) U.S. Cl.
CPC ............ *H04N 9/3179* (2013.01); *G06T 5/20* (2013.01); *G06T 7/50* (2017.01); *H04N 5/33* (2013.01); *H04N 9/3147* (2013.01); *H04N 9/3161* (2013.01)

(58) Field of Classification Search
None
See application file for complete search history.

(56) References Cited

U.S. PATENT DOCUMENTS

| | | | | |
|---|---|---|---|---|
| 2005/0052866 | A1* | 3/2005 | Bar-Cohen | B05B 17/0607 362/253 |
| 2009/0015730 | A1* | 1/2009 | Arakawa | H04N 5/74 348/744 |
| 2009/0096994 | A1* | 4/2009 | Smits | G02B 26/101 353/30 |
| 2014/0192076 | A1* | 7/2014 | Tan | H04N 9/3147 345/582 |
| 2015/0178412 | A1* | 6/2015 | Grau | G06F 17/50 703/1 |

(Continued)

OTHER PUBLICATIONS

Jaynes et al.; Super-Resolution Composition in Multi-Projector Displays; Metaverse Lab, Dept. of Computer Science University of Kentucky; 2003; 8 pgs.

(Continued)

*Primary Examiner* — Samira Monshi
(74) *Attorney, Agent, or Firm* — K&L Gates LLP

(57) ABSTRACT

Devices and techniques are generally described for multi-band projection of image data. In various examples, image data may be identified. In some examples, first image data of a first frequency may be generated from the image data. In some examples, second image data of a second frequency may be generated from the image data. In various examples, the first frequency may be higher than the second frequency. In some examples, a first image may be projected onto a projection surface using a raster projector. In an example, the first image may correspond to the first image data. In further examples, a second image may be projected onto the projection surface overlaying the first image. In various other examples, projecting the second image onto the projection surface may be performed using a lamp-based projector. In some examples, the second image may correspond to the second image data.

19 Claims, 6 Drawing Sheets

(56) References Cited

U.S. PATENT DOCUMENTS

2015/0310620 A1* 10/2015 Aviv ...................... G06T 7/521
  382/154

OTHER PUBLICATIONS

Author unknown; Microscanner; Retrieved from https//en.wikipedia.org/wiki/Microscanner on Dec. 9, 2016; 5 pgs.
Author unknown; Raster Scan; Retrieved from https//en.wikipedia.org/wiki/Raster_scan on Dec. 9, 2016; 6 pgs.

* cited by examiner

MULTIPLE FREQUENCY BAND IMAGE DISPLAY SYSTEM

BACKGROUND

Cameras and other image sensors may be used to capture images and/or videos of a physical environment. Often, individuals take digital photographs of themselves and/or of others to memorialize a moment or to share photographs on social networks and/or over the internet. Often, images captured using mobile device cameras as well as images found on the internet are viewed on the relatively small displays that tend to be integrated into mobile devices. Provided herein are technical solutions to improve sending of video and other types of data that may reduce problems associated with changing network conditions.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for capturing and/or displaying image content. Image data, as described herein, may refer to stand-alone frames of image data or to multiple frames of sequential image data, appended together to form a video. Image data may be comprised of a plurality of pixels arranged in a two-dimensional grid including an x component representing a horizontal direction in the grid and a y component representing a vertical direction in the grid. A pixel may be the smallest addressable unit of image data in an image. A particular pixel may be identified by an x value, representing the horizontal position of the pixel in the two-dimensional grid and a y value, representing the vertical position of the pixel in the two-dimensional grid.

Figure 1:
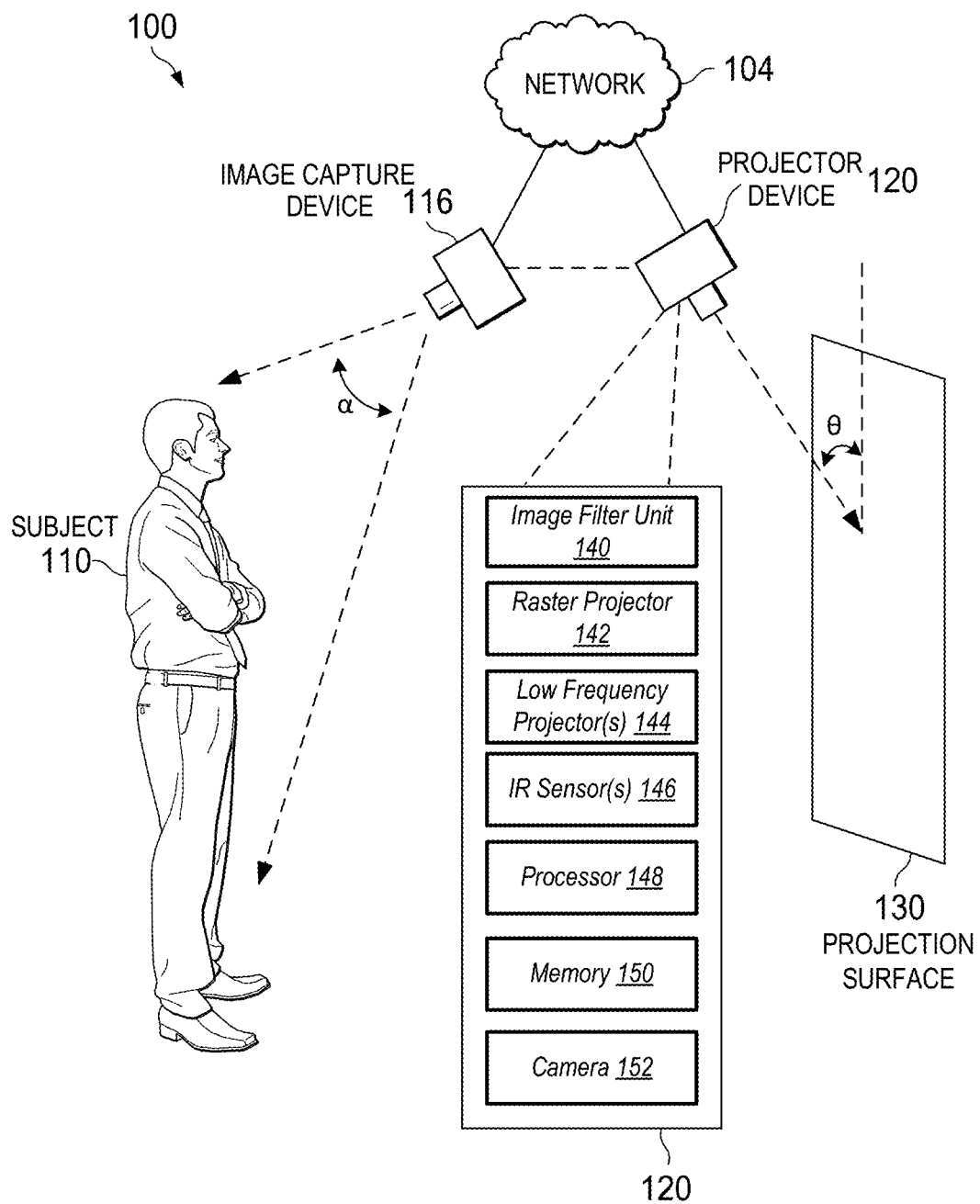
FIG. 1 is a diagram showing an example environment of a display system, arranged in accordance with various aspects of the present disclosure.

FIG. 1 is a diagram showing an example environment 100 of a display system, arranged in accordance with various aspects of the present disclosure. The environment 100 comprises image capture device 116, a projector device 120, and a projection surface 130. Image capture device 116 may include, for example, a digital camera module. The digital camera module may comprise any suitable type of image sensor device or devices, such as a charge coupled device (CCD) and/or a complementary metal-oxide semiconductor (CMOS) sensor effective to capture image data from environment 100. Image capture device 116 may include one or more lenses and may be positioned so as to capture images of a portion of environment 100 disposed along an optical axis of image capture device 116. In various examples, lenses of image capture device 116 may be wide-angle lenses effective to capture an angle of view greater than about 55°. For example, image capture device 116 may be effective to capture an angle α of a field of view of environment 100. Image capture device 116 may include, or may be configured to be in communication with, a processing element and/or a memory. Although in FIG. 1 image capture device 116 is shown as being angled downward toward a subject 110, image capture device 116 may be positioned at any angle within environment 100. Image capture device 116 may include, or may be configured to be in communication with, projector device 120.

Projector device 120 may be effective to receive and display image data and/or video data captured by image capture device 116. In some other examples, projector device 120 may be effective to receive and display image data received from a computing device. In various examples, projector device 120 may receive image data via a network 104. For example, projector device 120 may be effective to receive image data from one or more content servers through network 104. Network 104 may be, for example, the internet, an intranet, a wide area network, a local area network, or the like. A user of projector device 120 may request image data and/or video data from a content server be sent over network 104 to projector device 120 for display. For example, a user of projector device 120 may control projector device 120 using a companion application installed on and executed by a mobile device such as a smart phone or other mobile computing device. The user may request that content from a particular website be displayed by projector device 120 through the companion application. The content server may send the requested content to projector device 120 for display on projection surface 130. Projector device 120 may be effective to display image and/or video content sent over network 104 on projection surface 130. In some examples, projector device 120 may be battery powered or may be powered by electrically coupling components of projector device 120 to an AC or DC power source.

A user of image capture device 116 may use a companion application to control image capture device 116 to capture images, video, and/or audio (e.g., in instances in which image capture device 116 includes a microphone) from environment 100. For example, subject 110 may be a user of image capture device 116 and projector device 120. Subject 110 may control image capture device 116 to capture a video of subject 110 and the portion of the environment 100 that is within the field of view of the lens of image capture device 116. Subject 110 may control projector device 120 to project the video onto projection surface 130. Subject 110 may control playback of the video using video commands such as pause, resume, fast-forward, rewind, slow down, etc. In some further examples, projector device 120 may display a preview image of the field of view of image capture device 116. A user of the image capture device 116 may instruct image capture device 116 to capture one or more still images while using the projection projected from projector device 120 onto projection surface 130 as a preview of the one or more still images. As is described in further detail below, the user of image capture device 116 and/or projector device 120 may control these devices in a variety of ways. For example, the user (e.g., subject 110) may control image capture device 116 and/or projector device 120 using voice commands, a companion application installed on and executed by a mobile device, a desktop computing device, or other terminal, or by a dedicated hardware controller configured to be in communication with image capture device 116 and/or projector device 120. In various examples, the controller device (not shown in FIG. 1) may communicate with image capture device 116 and/or projector device 120 using network 104 which may be, for example, a Wi-Fi network. In some other examples, the controller device may communicate with image capture device 116 and/or projector device 120 using an infrared signal or other short-range wireless signal (e.g., a Bluetooth signal), wired communication, or by a user interface of image capture device 116 and/or projector device 120.

In some examples, image capture device 116 and projector device 120 may be included in the same housing and may be configured to be in communication with one another. In other examples, image capture device 116 and projector device 120 may be disposed in separate housings and may be configured to communicate over a wired or wireless connection. In examples where image capture device 116 and projector device 120 communicate wirelessly, image capture device 116 and projector device 120 may include wireless transmitters and/or receivers (not shown in FIG. 1).

Projector device 120 may be a low-power projector with a short throw ratio. The throw ratio of a projector may be a unitless ratio D:W defined of the distance D measured from a lens of the projector to the projection surface 130 to the width of the image W that the projector is to project. In some examples, projector device 120 may have a throw ratio of 0.4:1 or greater. Projector device 120 may include one or more telecentric lenses effective to prevent the edges or borders of a displayed image from appearing dimmer relative to the center of the displayed image. Projector device 120 may be effective to be positioned relatively near to projection surface 130 (e.g., within 1 meters) with a projection angle θ between an optical axis of projector device 120 and the projection surface 130. In some cases, projector device 120 may be positioned within a few inches (e.g., <10 inches) of projection surface 130. Although the projector device 120 depicted in FIG. 1 is angled downward toward projection surface 130, in other examples, projector device 120 may be angled upward toward projection surface 130 and/or laterally toward projection surface 130, depending on the layout of the particular environment 100 and the positioning of the projector device within environment 100.

Projector device 120 may include a processor 148 and a memory 150. Memory 150 may be effective to store image data, video data, audio data and/or executable instructions related to projection of image data, video data, and/or audio data. Processor 148 may be effective to execute the instructions stored in memory 150 and may be configured to control various other components of projector device 120, as described in further detail below. Although in the examples below, processor 148 is described as performing various actions related to calibration of projector device 120 and/or projection of images onto projection surface 130; in at least some other examples, the image processing techniques described below may be performed in whole or in part by one or more other processing units, including local processing units and/or processing units configured to be in communication with projector device 120 over network 104. Processing units, as described herein, may include programmable circuits, such as field programmable gate arrays (FPGAs), application specific integrated circuits (ASICs), or processing chips such as those included in microcontrollers and/or computing devices.

Projector device 120 may comprise an image filter unit 140, a raster projector 142, one or more low frequency projectors 144, one or more IR sensors 146, one or more processors 148, and/or a memory 150. Image filter unit 140 may comprise one or more electronic filters effective to filter out signals above and/or below a particular frequency. For example, image filter unit 140 may comprise a high-pass filter effective to pass signals with a frequency higher than a particular cutoff frequency. Signals with frequencies below the cutoff frequency may be attenuated by the high-pass filter. Accordingly, a high-pass image filter may be effective to filter image data received by projector device 120 into frequency components of the image data that are above the cutoff frequency. Such frequency components may be referred to herein as "high frequency" components of image data. In some further examples, image filter unit 140 of projector device 120 may comprise a low-pass filter effective to pass signals with a frequency lower than a particular cutoff frequency. Signals with frequencies above the cutoff frequency may be attenuated by the low-pass filter. Accordingly, a low-pass image filter may be effective to filter image data received by projector device 120 into frequency components of the image data that are below the cutoff frequency. Such frequency components may be referred to herein as "low frequency" components of image data. In some further examples, image filter unit 140 of projector device 120 may comprise a band-pass filter effective to pass frequencies within a certain range and attenuate frequencies outside that range (or "band").

Image filter unit 140 may comprise one or more of the low-pass, high-pass and/or band-pass filters described above, and may be instituted as software or may be instituted as one or more dedicated circuits in, for example, a digital signal processor (DSP) chip, a field-programmable gate array (FPGA), an application specific integrated circuit (ASIC) or the like. In various other examples, image filters of image filter unit 140 may be instituted as some combination of hardware and software. In some examples, the highest frequency ranges of image data resulting from high-pass filtering may have a frequency of less than or equal to 60 line-pairs or pixel-pairs per degree. In some further examples, the lowest frequency ranges of image data resulting from low-pass filtering may have a frequency of greater than or equal to 0.2 line-pairs or pixel-pairs per degree. In some other examples, frequency of filtered image data may be measured in Hertz or other appropriate units. In addition to filtering based on frequency, in some examples, image data may be filtered by image filter unit 140 to separate chrominance values of image data from luminance values of image data. In such examples, the chrominance channel and luminance channel of image data may be projected separately by projector device 120. For example, raster projector 142 may project high frequency luminance data while low frequency projectors 144 may project low frequency chrominance data. In some examples, discrete cosine transform (DCT) may be employed by image filter unit 140 to separate image data into various frequencies. In yet other examples, wavelet based image transforms may be used by image filter unit 140 to separate image data. In some examples, a portion or region of the image may be identified as a region of interest. In some examples, one or more regions of interest in the image data may be projected by a different projector or a different combination of projectors relative to other portions of the image data in order to render the region of interest with increased precision and/or resolution relative to the other portions of the image data.

Projector device 120 may comprise a raster projector 142. Raster projector 142 may be a laser projection device and may comprise and/or be configured in communication with a microelectromechanical (MEMS) scanning mirror. The raster projector 142 may emit laser light that may be directed onto the MEMS scanning mirror which may, in turn, direct the light line-by-line in a raster scanning pattern onto projection surface 130. Raster projector 142 may not require a lens as laser light emitted by raster projector 142 may be highly collimated. Advantageously, raster projector 142 may have a smaller form factor and may consume less power relative to traditional lamp-projection systems. Higher color saturation of laser light as compared to non-laser light projected by lamp-projection systems may allow the projector device 120 to project lower power and lower lumen images that may appear to be equivalent in quality to higher power, higher lumen lamp-projected images. Accordingly, projector device 120 may consume less power than lamp-projection systems while producing equivalent quality images.

After image data has been separated by a high pass image filter of image filter unit 140 into high frequency image data, raster projector 142 may be effective to project the high frequency image data onto projection surface 130. In some examples, processor 148 of projector device 120 and/or the MEMS scanning mirror of raster projector 142 may be effective to adjust the angle or distance between emitted raster scan lines in a non-uniform fashion based on the distance between the raster projector 142 and the position on projection surface 130 where the raster scan line is to be projected, in order to maintain the quality of the projected image.

For example, the angle or distance between raster scan lines may be decreased at the point of emission from projector device 120 as the scan lines are projected further away from the raster projector 142 on projection surface 130. The angle or distance between raster scan lines may be adjusted by movements of the MEMS scanning mirror of raster projector 142 such that light incident on the MEMS scanning mirror is reflected toward a particular position on projection surface 130. For example, the MEMS scanning mirror may be effective to cause laser light emitted from the raster projector 142 to be reflected from the MEMS scanning mirror at different angles. In the example depicted in FIG. 1, the raster scan lines projected at the top of the projection surface 130 would be projected with the shortest distance or smallest angle between projected raster scan lines at the point of emission from projector device 120. As projection surface 130 is traversed in a downward direction (relative to the standing subject 110 in FIG. 1), the distance or angle between projected raster scan lines will be decreased by processor 148 in order to maintain image quality. Similarly, if the projector device 120 was disposed below the projection surface 130, the distance or angle between raster scan lines would be decreased while traversing the projection surface 130 in an upward direction. In general, the further the portion of the projection surface 130 is from the raster light source, the smaller the distance between raster scan lines projected by raster projector 142. Although, the steps between raster scan lines may be reduced by processor and/or MEMS scanning mirror at the point of emission from projector device 120, the scan lines appearing on projection surface 130 may be separated by a uniform distance. This is because the processor and/or MEMS scanning mirror account for the increased divergence of light beams that travel further from the light emission source by dynamically adjusting the angle between raster scan lines at the point of emission from projector device 120, as described above.

In various examples, projector device 120 may comprise one or more infrared (IR) sensors 146. Infrared sensors 146 may be used to detect infrared light reflected from projection surface 130 in order to determine information about projection surface 130 and/or generate a depth map and/or height map of projection surface 130. In some examples, non-infrared depth sensors, such as passive stereo camera pairs, or non-identical camera pairs, may be used in projector device 120 in place of, or in addition to, infrared sensors 146. Such non-infrared depth sensors may be used to determine information about projection surface 130 and/or generate a depth map and/or height map of projection surface 130. Additionally, in some examples, passive stereo camera pairs may use ambient light of an environment in which projector device 120 is situated to generate a depth map. Stereo camera pairs may locate the displacement (sometimes referred to as "parallax" or "disparity") of objects and/or features between the left image and the right image captured by the stereo camera pair.

In various examples, a depth map may model the surface shape, reflectance, color, and microgeometry of the projection surface 130. Similarly, a height map may model the projection surface 130 using the projection surface itself as a reference. In some examples, a mesh of the projection surface 130 may be computed based on either the depth map or the height map of projection surface 130. Raster projector 142 may be effective to emit infrared light used to model projection surface 130 and to determine a distance between projector device 120 and various portions of projection surface 130. In some other examples, projector device 120 may include a separate infrared light source apart from raster projector 142.

As described above, when projecting images and/or videos onto projection surface 130, processor 148 and/or a scanning MEMS mirror of raster projector 142 may decrease the projection angle of scan lines as the scan lines are projected further and further away from the raster projector 142. Projector device 120 may be effective to determine the distance that individual raster scan lines are to be projected based on the raster scan line's position within the image data and based on the depth map generated using data sensed by the one or more IR sensors 146 (e.g., by using time-of-flight data).

In various examples, projector device 120 may emit infrared light with raster projector 142 only during a calibration process. The calibration process may be performed during startup of the projector device or when ambient conditions have changed between uses. For example, if the projection surface 130 changes, the calibration procedure may be instituted. In other examples the calibration procedure may be instituted based on a local or remote command to calibrate or recalibrate the projector device 120. In various further examples, the projector device 120 may be calibrated upon powering on or "waking" from a low power state.

In some examples, projector device 120 may include a camera 152 with an image sensor facing toward the projection surface 130 and used to sense ambient light and color of reflected light from the projection surface 130. In various examples, the processor 148 may be effective to control the raster projector 142 and/or one or more low frequency projectors 144 to adjust colors of light projected by projector device 120 based on colors of light reflected from projection surface 130 and sensed by the camera 152. In an example, processor 148 may compare a color value of light reflected from a portion of the image projected on projection surface 130 to a color value of the corresponding portion of the image stored in memory 150. Processor 148 may be effective to instruct projector device 120 to adjust the color value of light based on a discrepancy between the reflected color value detected by the image sensor facing projection surface 130 and the expected color value of the image data stored in memory 150.

For example, projection surface 130 may be a white wall with a horizontal red stripe across the white wall. Camera 152 may detect the color information of the projection surface 130. Processor 148 may alter the color of the image projected by raster projector 142 and/or by one or more low frequency projectors 144 to correct for the colored projection surface 130, such that colors of the projected image appear as though projected on a uniformly-colored projection background (e.g., a white matte background). Similarly, camera 152 may detect ambient light information from environment 100. Processor 148 may alter luminance values of the image projected by raster projector 142 and/or by one or more low frequency projectors 144 to correct for ambient light information detected by camera 152.

In some examples, light from an image projected by projector device 120 may be detected by camera 152 as the light projected by projector device 120 is reflected from projection surface 130. Processor 148 may compare color values of the projected image detected by camera 152 to color values of the image data corresponding to the projected image stored in memory 150. If processor 148 determines that a discrepancy exists between the projected color values and the color values stored in memory 150, processor 148 may execute a color correction algorithm to determine adjustments to the color values of the projected image to correct the discrepancy. Similarly, processor 148 may correct and/or adjust for discrepancies in apparent geometry of the projected image caused by non-uniform elements in projection surface 130 by comparing the projected image data to the image data stored in memory 150.

Projector device 120 may further comprise one or more low frequency projectors 144. Low frequency projectors 144 may be lamp-based projectors, such as an LED projector, and may be effective to project light representing image data through one or more telecentric lens onto projection surface 130. In at least some examples, each low frequency projector 144 may be used to project a particular frequency band of image data produced after the image data has been separated into different frequency bands by image filters of image filter unit 140. For example, projector device 120 may comprise raster projector 142, a first low-frequency projector 144 and a second low-frequency projector 144. Image filters of image filter unit 140 may comprise one or more of a high-pass filter, a low-pass filter, and a band-pass filter. As such, image data may be separated into a high-frequency band, a mid-frequency band, and a low-frequency band. Raster projector 142 may project the high-frequency band of the image data onto projection surface 130. The first low-frequency projector 144 may project the mid-frequency band of the image data resulting from the band-pass filter onto projection surface 130 through a telecentric lens. Similarly, the second low-frequency projector 144 may project the low-frequency band of the image data resulting from the low-pass filter onto projection surface 130 through a different telecentric lens. Each telecentric lens may be arranged so as to have the same field of view. The field of view of each telecentric lens is a function of the focal length of the telecentric lens and a size of the imager of the particular low-frequency projector 144. Although referred to herein as "low-frequency" projectors 144, such projectors may be effective to project any frequency band of image data and may be referred to herein as "low-frequency" simply to reflect the fact that it may be advantageous, in some embodiments, to use the lamp-based projectors to project lower frequency bands of image data, relative to the high frequency image data projected by raster projector 142, in order to conserve power usage.

In another example, a single low frequency projector 144 may be used to project a frequency band of image data produced after the image data has been separated into a high-frequency component and a low-frequency component by image filters of image filter unit 140. For example, projector device 120 may comprise raster projector 142 and a single low-frequency projector 144. Image filter unit 140 may comprise a high-pass filter effective to pass all image data with a frequency value greater than or equal to x and a low-pass filter effective to pass all image data with a frequency less than x. As such, image data may be separated into two frequency bands: a high-frequency band and a low-frequency band. Raster projector 142 may project the high-frequency band of the image data onto projection surface 130. The low-frequency projector 144 may project the low-frequency band of the image data resulting from the low-pass filter onto projection surface 130 through a telecentric lens.

Projector device 120 may undergo an alignment calibration to align overlapping frequency bands of projected images such that the resultant image projected on projection surface 130 is aligned and does not appear blurry. Such a calibration may be performed by detecting the projected frequency bands with camera 152 and comparing such image data to image data stored in memory 150. In some examples, special calibration images may be used to perform the alignment calibration. In various examples, the alignment calibration may be performed when the projector device 120 is produced in a manufacturing setting or refurbishing setting. In various other examples, a user of projector device 120 may institute an alignment calibration through a user interface of projector device 120 or through an interface effective to control projector device 120.

Although in FIG. 1 projector device 120 is shown in environment 100 along with image capture device 116, in at least some examples, projector device 120 may function independently of image capture device 116 and may not require input from image capture device 116. For example, as described above, projector device may receive image data from a content server over network 104. In another example, a user may upload or download image data to memory 150 and may control projector device 120 to project image data stored in memory 150.

Figure 2:
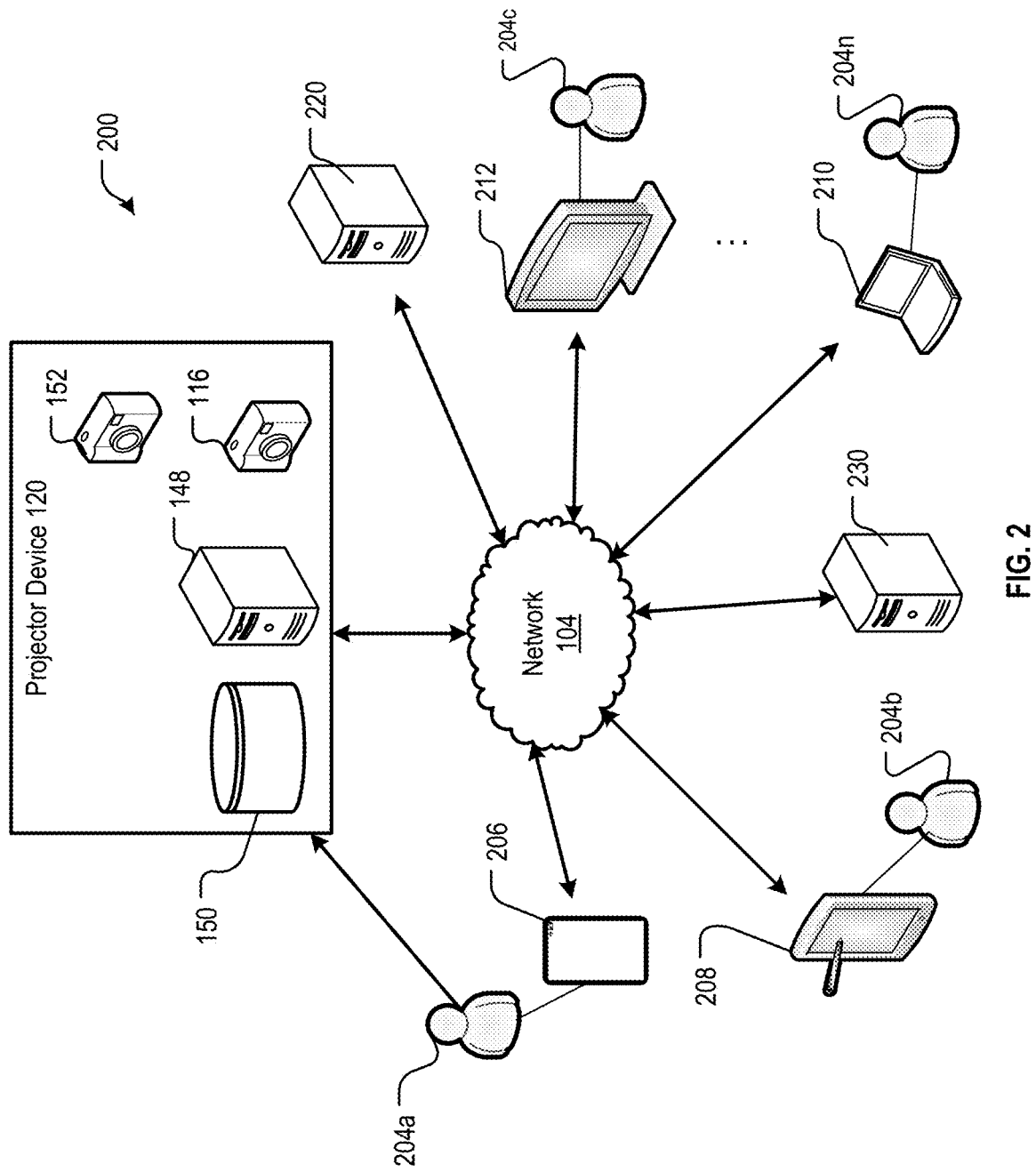
FIG. 2 is a diagram showing an example environment with which the display system depicted in FIG. 1 may be used, in accordance with various aspects of the present disclosure.

FIG. 2 is a diagram showing one example of an environment 200 with which the display system depicted in FIG. 1 may be used, in accordance with various aspects of the present disclosure. In the example shown in FIG. 2, projector device 120 comprises image capture device 116, although, as described above, in other examples, image capture device 116 may be separate from and function independently from projector device 120.

The environment 200 comprises projector device 120 and users 204a, 204b, 204c, 204n. Each user 204a, 204b, 204c, and 204n may use one or more user devices such as, for example, mobile device 206, tablet computer 208, laptop computer 210, and/or display device 212. Although four users 204a, 204b, 204c, 204n are shown, any suitable number of users may be part of the environment 200. Also, although each user 204a, 204b, 204c, 204n shown in FIG. 2 is associated with a particular device (such as mobile device 206 associated with user 204a, tablet computer 208 associated with user 204b, display device 212 associated with user 204c, and laptop computer 210 associated with user 204n), each user 204a, 204b, 204c, 204n may use additional user devices or fewer user devices from what is shown. Additionally, each user 204a, 204b, 204c, 204n may use different user devices apart from what is shown in environment 200 of FIG. 2.

Projector device 120 may perform the various utilities described herein including, for example, short throw projection of images and videos onto a projection surface 130 (depicted in FIG. 1). As shown and described, projector device 120 may comprise one or more image capture devices 116, one or more cameras 152, one or more processors 148, and/or one or more memories 150. Although not depicted in FIG. 2, projector device may also comprise one or more infrared sensors, one or more image filters, one or more raster projectors, and/or one or more lamp-based projectors, as described above with respect to FIG. 1. In some examples, the memory 150 may store images captured by the one or more camera modules 116, or received from the various user devices, as well as instructions for performing image perspective transformation. The various components 150, 116, 148 of the projector device 120 may be at a common geographic location and/or may be distributed across multiple geographic locations. For example, the projector device 120 and image processing (e.g., color correction and image geometry correction) associated therewith may be implemented in whole or in part as a cloud or Softare as a Service (SaaS) system. In some examples, the projector device 120 may project and/or perform color correction, alignment calibration, geometric correction, etc. on images received from multiple different users 204a, 204b, 204c, 204n (e.g., via their associated cameras, computing devices, or other devices). In various other examples, projector device 120 may capture images using one or more image capture devices 116. Various user devices (such as mobile device 206 associated with user 204a, tablet computer 208 associated with user 204b, display device 212 associated with user 204c, and laptop computer 210 associated with user 204n) may include a companion application effective to send instructions to image capture device 116 and/or projector device 120. For example, user 204a may execute a companion application on mobile device 206 and may send commands to image capture device 116 and/or projector device 120. In various examples, user 204a may use the companion application to capture image data with image capture device 116 and to project the captured image data with projector device 120. In some further examples, user 204a may instruct projector device 120 to enter a calibration mode in order to perform a color correction and/or image geometry correction to images projected by projector device 120.

The various components of the environment 200 may be in communication with one another via a network 104. As described previously, the network 104 may be and/or comprise any suitable wired or wireless network configured according to any suitable architecture or protocol. In some examples, the network 104 may comprise the Internet.

User devices, such as mobile device 206, tablet computer 208, display device 212, and laptop computer 210 may be utilized to control image capture device 116 to capture still and/or video images. Similarly, user devices, such as mobile device 206, tablet computer 208, display device 212, and laptop computer 210 may be utilized to control projector device 120 to project still and/or video images. In various examples, user devices may execute a companion application to control operation of image capture device 116 and/or projector device 120.

In some examples, user devices including mobile device 206, tablet computer 208, display device 212, and/or laptop computer 210 may be configured to communicate with other components of the environment 200 utilizing, for example, a wired or wireless connection. For example, mobile device 206, tablet computer 208, display device 212, and/or laptop computer 210 may send and receive data (such as, for example, commands and/or image data) via a wired connection, such as Universal Serial Bus (USB), or wireless connection, such as near field communication (NFC) or Bluetooth. In some examples, the user devices may be configured to receive still images and/or video directly from image capture device 116, for example, via the network 104. Although user devices are described as mobile device 206, tablet computer 208, display device 212, and/or laptop computer 210, the user devices may be any suitable type of computing device comprising at least one processor and non-transitory computer-readable memory. In some examples, the user devices may be configured to receive image frames captured by the image capture device 116 and projected by projector device 120. Also, in some examples, the user devices may comprise one or more camera modules and associated optics for capturing images and/or video and uploading the resulting frames to projector device 120 for display. In some examples, the user devices, such as mobile device 206, tablet computer 208, display device 212, and/or laptop computer 210, may be configured to communicate on a cellular or other telephone network.

In various examples, users, such as users 204a, 204b, 204c, 204 may control projector device 120 and/or image capture device 116 using audible commands. For example, a user 204a may speak a "wake word" that may be a spoken, audible command. A wake word may be, for example, a word or phrase for which a wake word engine of image capture device 116 and/or projector device 120 continually listens. A microphone of image capture device 116 and/or projector device 120 may detect the spoken wake word and, in response, subsequent audio captured by the microphone will be processed to detect further audible commands and/or the subsequent audio received by the microphone of image capture device 116 and/or projector device 120 may be transmitted to a voice recognition server 220. In the example, user 204a may "wake" the image capture device 116 and/or projector device 120 to further voice commands using the wake word, and may thereafter speak an audible command for image capture device 116 to take a video or take a picture. Similarly, a user may speak an audible command for projector device 120 to project a particular image or video, or to enter a calibration mode. Audio may be transmitted/streamed from projector device 120 and/or image capture device 116 over network 104 to voice recognition server 220 in any audio file format, such as mp3, mp4, or the like. Voice recognition server 220 may receive the transmitted or streamed audio. Upon determining that the audio content has reached an endpoint, voice recognition server 220 may analyze the received audio stream and may translate the audio stream into natural language. Voice recognition server 220 may determine whether or not the natural language corresponds to a command. If so, the voice recognition server 220 may send the command over network 104 to image capture device 116 and/or projector device 120. For example, a user 204a may speak the command, "Take a picture" to projector device 120 and/or image capture device 116. Projector device and/or image capture device 116 may transmit the voice command to voice recognition server 220. Voice recognition server 220 may analyze the audio stream and may translate the audio stream into natural language. Voice recognition server 220 may determine that the natural language "Take a picture" corresponds to a command effective to instruct projector device 120 to capture an image using image capture device 116. Voice recognition server 220 may send the command over network 104 to projector device 120. The command may be effective to cause image capture device 116 to capture an image.

In other examples, a user 204a may speak the command, "Project Birthday Video" to projector device 120. Projector device 120 may transmit the voice command to voice recognition server 220. Voice recognition server 220 may analyze the audio stream and may translate the audio stream into natural language. Voice recognition server 220 may determine that the natural language "Project Birthday Video" corresponds to a command effective to instruct projector device 120 to project a video titled "Birthday Video" onto a projection surface. In various examples, "Birthday Video" may be stored in memory 150 or may be stored in a different memory accessible by projector device 120 over network 104. Voice recognition server 220 may send the command over network 104 to projector device 120. The command may be effective to cause projector device 120 to access and project the appropriate video.

In some embodiments, the microphone for capturing voice commands may be provided on a different device separate from the projector device 120 and the image capture device 116. The processing of the voice command and/or transmission of the audio to the voice recognition server 220 may similarly be performed by a device other than the image capture device 116 and the projector device 120.

In various examples in which color correction, depth map creation, image calibration, addition of augmented reality image data (e.g, "AR skins") is implemented at least in part in a cloud service or SaaS environment, such techniques may be performed at an image transformation device 230. Although depicted as different computing devices in FIG. 2, in some examples, image transformation device 230 and voice recognition server 220 may be implemented in the same housing. Similarly, in various examples, image transformation device 230 may be implemented in the same housing as projector device 120. In yet other examples, image transformation device 230 may receive image data captured by image capture device 116 and/or camera 152 via network 104. After performing image transformation in accordance with the various techniques described herein, image transformation device 230 may send transformed image data over network 104 to projector device 120 and/or to one or more user devices and/or other computing devices, such as, for example, a social media server. In some examples, transformed image data may be sent to a computer vision system (not shown). The computer vision system may be programmed to recognize various features of a subject or subjects depicted in the perspective-transformed images. For example, the computer vision system may be programmed to recognize a face of a subject. In some other examples, the computer vision system may be programmed to recognize articles of clothing worn by a subject. Clothes may be identified by matching a particular item being worn by a subject to a particular item of clothing known to have been purchased by the user of image capture device 116 and/or projector device 120 or stored in a database, such as an online-shopping catalog database. For example, the computer vision system may be in communication with one or more other computing systems that include profile information related to the subject. The computer vision system may identify particular articles of clothing worn by a subject by querying other computer systems, such as a server of an online-shopping website from which the user has purchased those articles of clothing. Similarly, the computer vision system may identify a subject by querying a computer system hosting a social media platform, which can provide to the computer vision system information about the subject (e.g., information about clothing purchased by the subject, worn by the subject in photos available to the social media platform, or other types of information available to social media platforms) to assist with the identification of that clothing by the computer vision system. In various examples, the computer vision system may be effective to insert metadata into the perspective-transformed image. In some examples, such metadata may be optionally displayed when image data is projected by projector device 120. The metadata may comprise a metadata "tag," or a hyperlink that, which selected by the user, will direct the user to a retail website where the particular article of clothing can be purchased.

Figure 3:
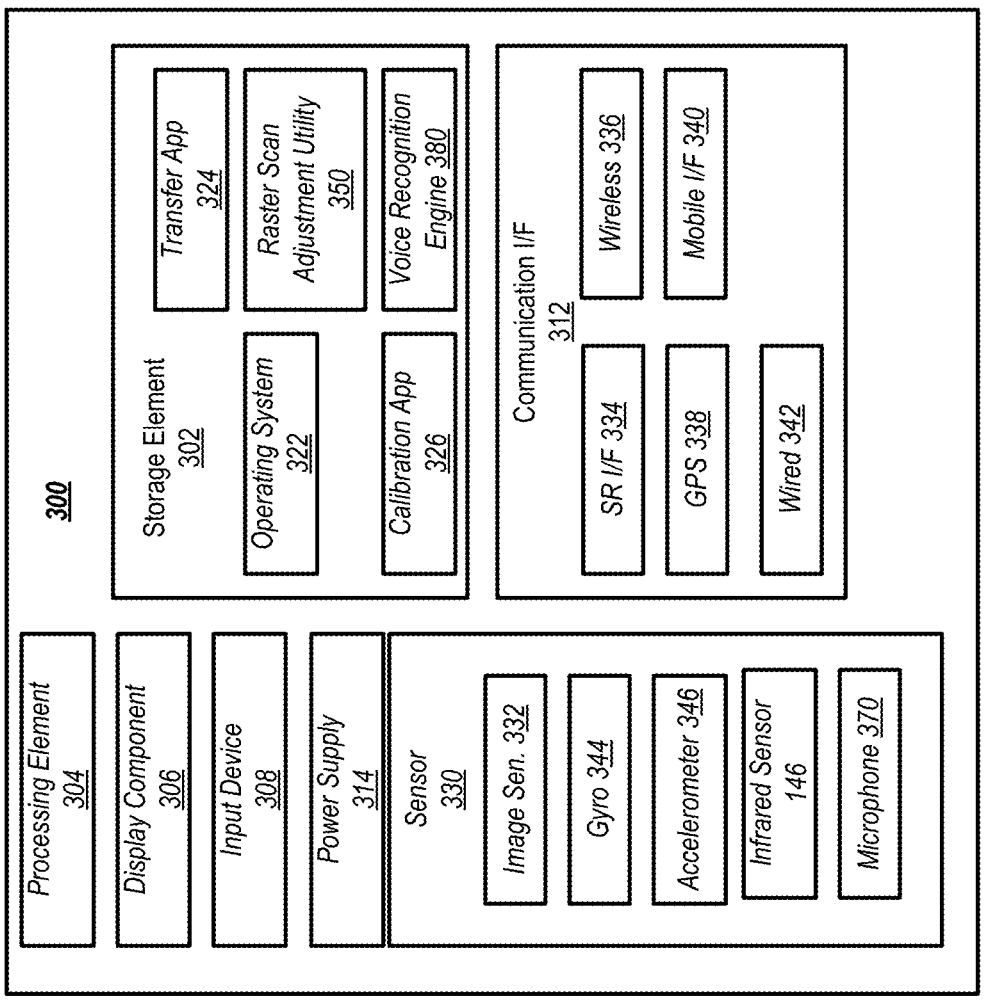
FIG. 3 is a block diagram showing an example architecture of a computing device in which the display system described in the present disclosure, or a portion thereof, may be implemented, in accordance with various embodiments described herein.

FIG. 3 is a block diagram showing an example architecture 300 of a user device, such as the projector devices, image capture devices, cameras, display devices, mobile devices, and other computing devices described herein. It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). In some examples, the processing element 304 may be effective to filter image data into different frequency bands, as described above. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to receive images and/or video from another device (e.g., a mobile device, image capture device, and/or display device) or from an image sensor 332 included in the architecture 300 (e.g., image capture device 116 and/or camera 152). In some examples, the transfer application 324 may also be configured to upload the received images to another device that may perform processing as described herein (e.g., a mobile device, another computing device, and/or transformation device 230). In some examples, a calibration application 326 may perform processing on image data stored and/or projected by a projector device 120 of the architecture 300 and/or from another device. For example, calibration application 326 may perform color correction to account for discrepancies between colors sensed from a projection surface and colors associated with image data stored in memory. Similarly, calibration application 326 may perform image geometry correction to account for projection of images on non-flat surfaces. Further, calibration application 326 may be effective to perform an alignment calibration for aligning multiple projections systems of projector device 120. For example, calibration application 326 may be effective to align overlapping frequency bands of projected images such that the resultant image projected on projection surface 130 (depicted in FIG. 1) is aligned and does not appear blurry. The alignment calibration may be performed by detecting the projected frequency bands with camera 152 (depicted in FIG. 2) and comparing such image data to image data stored in memory 150 (depicted in FIG. 1). In some examples, special calibration images may be used by calibration application 326 to perform the alignment calibration. In various examples, the alignment calibration may be performed when the projector device 120 is produced in a manufacturing setting or refurbishing setting. In various other examples, a user of projector device 120 may institute an alignment calibration through a user interface of calibration application 326.

In some examples, storage element 302 may include a raster scan adjustment utility 350. The raster scan adjustment utility 350 may be configured to adjust the distance or angle between raster scan lines at the point of projection based on the distance between the projection light source and the surface onto which the raster scan line is to be projected. The raster scan adjustment utility may allow the raster projector 142 (depicted in FIG. 1) to project a non-distorted image even when projector device 120 is placed a short distance (e.g., ≤3 meters) from projection surface 130. As described above, the raster scan adjustment utility 350 may account for the increased divergence of raster scan lines as the raster scan lines are projected further and further away from the raster projector 142. Raster scan adjustment utility 350 may determine the distance that raster scan lines are projected using infrared light projected by raster projector 142 and reflected from projection surface 130. Infrared sensors 146 may detect the reflected infrared light. Processor 148 and/or raster scan adjustment utility 350 may determine a distance of the projected raster scan lines based on the time-of-flight of the projected and reflected infrared light.

When implemented in some user devices, the architecture 300 may also comprise a display component 306. The display component 206 may comprise one or more light-emitting diodes (LEDs) or other suitable display lamps. Also, in some examples, the display component 206 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. In various examples, the display component 206 may be effective to show preview images and/or thumbnails of the images and/or videos to be projected by projector device 120.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis, as described above in reference to FIG. 2. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices such as the user devices depicted in FIG. 2 (including mobile device 206 associated with user 204a, tablet computer 208 associated with user 204b, display device 212 associated with user 204c, and laptop computer 210 associated with user 204n). For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol. In various examples where architecture 300 represents projector device 120 and/or image capture device 116 (shown in FIG. 1), mobile interface 340 may allow projector device 120 and/or image capture device 116 to communicate with one or more other computing devices such as the various computing devices shown in FIG. 2. For example, projector device 120 and/or image capture device 116 may receive a command from a user device, an application of a user device, or a voice recognition server to capture and/or project an image. Projector device 120 and/or image capture device 116 may receive a command from the user device to send the captured image frame to the mobile device or to a social media site. In another example, a user device may be effective to send an instruction to a social media website or other content server to have image data sent to projector device 120 for display on projection surface 130.

The architecture 300 may also include one or more position sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output. An example of an image sensor 332 may be camera 152 shown and described in FIGS. 1 and 2. As described, camera 152 may be configured to capture color information, image geometry information, and/or ambient light information related to projection of image data onto a projection surface 130.

Motion sensors may include any sensors that sense motion of the architecture including, for example, gyro sensors 344 and accelerometers 346. Motion sensors, in some examples, may be used to determine an orientation, such as a pitch angle and/or a roll angle, of image capture device 116 and/or projector device 120 (shown in FIG. 1). The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338. Infrared sensor 360 may be effective to determine a distance between a surface, such as projection surface 130 and projector device 120 (shown in FIG. 1). In some examples, the infrared sensor 146 may determine the contours of the surface and may be capable of using computer vision techniques to recognize facial patterns or other markers within the field of view of the infrared sensor 146's camera. In some examples, the infrared sensor 146 may include an infrared projector and camera. In other examples, a raster projector of architecture 300 (e.g., raster projector 142 depicted in FIG. 1) may project infrared light that may be sensed by infrared sensor 146. Processing element 304 may build a depth map based on detection by the infrared camera of a pattern of structured light displayed on a surface by the infrared projector. In some other examples, the infrared sensor 146 may include a time of flight camera that may compute distance based on the speed of light by measuring the time of flight of a light signal between a camera of the infrared sensor 146 and a surface, such as subject 110 or projection surface 130 shown in FIG. 1. In various examples, infrared sensor 146 may be effective to determine the pitch angle and/or roll angle of projector device 120 and/or image capture device 116. Further, in some examples, processing element 304 may be effective to determine the location of various objects in the physical environment within the field of view of image capture device 116 and/or projector device 120 based on the depth map created by the infrared sensor 146. As noted above, in some examples, non-infrared depth sensors, such as passive stereo camera pairs, or non-identical camera pairs, may be used in projector device 120 in place of, or in addition to, infrared sensors 146. Such non-infrared depth sensors may be used to determine information about projection surface 130 and/or generate a depth map and/or height map of projection surface 130. Processing element 304 may build a depth map based on detection by non-infrared depth sensors of a pattern of light displayed on a surface by a light source of projector device 120. Processing element 304 may be effective to determine the location of various objects in the physical environment within the field of view of image capture device 116 and/or projector device 120 based on the depth map created by one or more non-infrared depth sensors.

Figure 4:
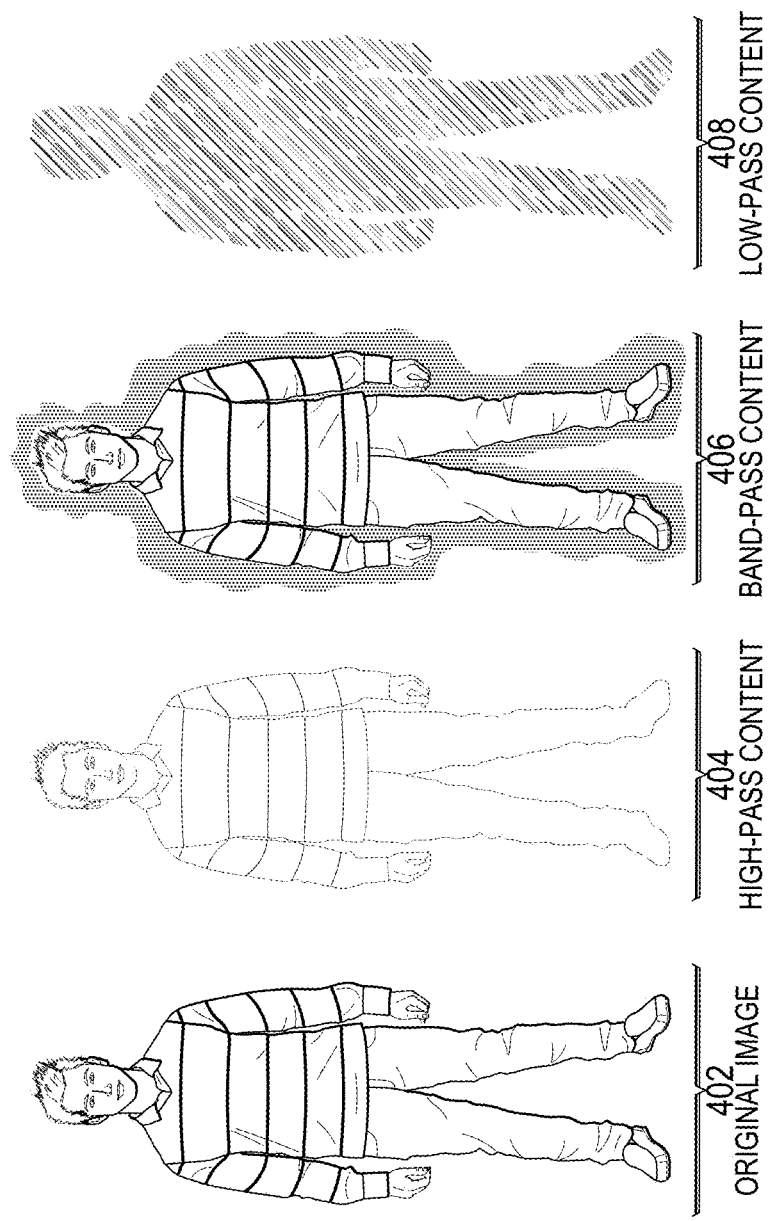
FIG. 4 depicts four versions of image content, in accordance with an aspect of the present disclosure.

FIG. 4 depicts four versions of image content, in accordance with an aspect of the present disclosure. Those components of FIGS. 1-3 that have been described above may not be described again herein for purposes of brevity and clarity.

In the example depicted in FIG. 4, original image 402 may represent a projection of image data onto a projection surface, such as projection surface 130 in FIG. 1. For purposes of the example depicted in FIG. 4, it may be assumed that the projection surface is a relatively uniform background in terms of surface geometry and color.

As previously described, image filter unit 140 may be effective to separate image data into various frequency bands. Thus, image data representing original image 402 may be separated by a high-pass filter, a band-pass filter, and a low-pass filter into high-pass image data, band-pass image data, and low-pass image data. High-pass image data of the original image 402 may resemble high-pass content 404 when projected on a projection surface. Similarly, band-pass image data of the original image 402 may resemble band-pass content 406 when projected on a projection surface. Finally, low-pass image data of the original image 402 may resemble low-pass content 408 when projected on a projection surface. Although FIG. 4 depicts separation of image content into three frequency bands, more or fewer frequency bands may be used in accordance with various other aspects of the present disclosure.

High-pass content 404 may be projected onto a projection surface using raster projector 142 described above in reference to FIG. 1. As shown in FIG. 4, high-pass content 404 includes relatively high-frequency image content depicting sharp changes in the displayed image. For example, high-pass content 404 shows the outline of the woman depicted in the original image 402 and sharp color transitions in the original image 402.

Band-pass content 406 and low-pass content 408 may be projected onto the projection surface using separate low-frequency projectors 144 described above in reference to FIG. 1. Using a raster projector to project the high-frequency image data may conserve power relative to using one or more lamp-based projectors to project the high-frequency image data. Also, raster projectors tend to have smaller form factors relative to lamp-based projectors. Accordingly, the form factor of the projector device 120 may be minimized by using a raster projector 142 to project high frequency image data. Additionally, the size of the imagers used in the low-frequency projectors 144 may be minimized to reduce the size or form factor of projector device 120. In some examples, using smaller-sized imagers of low-frequency projectors 144 may result in a lower resolution relative to using larger imagers. Accordingly, in some cases, there may be a trade off between image resolution and a size of low-frequency projectors 144.

As previously described, high-pass content 404, band-pass content 406, and low-pass content 408 may be projected on a projection surface such that each frequency band of content overlays one another and aligns with one another. Accordingly, in the example depicted in FIG. 4, the high-pass content 404 may be projected by raster projector 142, the band-pass content 406 may be projected overlaying high-pass content 404 by a first low-frequency projector 144, and the low-pass content 408 may be projected overlaying high-pass content 404 and band-pass content 406 by a second low-frequency projector 144. The overlapping frequency bands of image content may be aligned during the alignment calibration process (described above) such that the overlapping image content recreates the original image 402 when viewed on the projection surface.

Although FIG. 4 depicts separation of original image 402 into three frequency bands, more or fewer frequency bands may be projected in accordance with various embodiments of the present disclosure. Further, in some examples, augmented image effects, image effect filters, and/or virtual reality effects may be added to the image content when projected on the screen. Augmentation of image data using augmented image enhancement may use edge detection to enhance various portions of the image. In some examples, the portion of the image to be enhanced may be selected by a user of projector device 120 through an interface. For example, a user may select a low-contrast, "glowing aura" augmented reality effect from an interface configured in communication with projector device 120 and/or with another computing device over network 104 (depicted in FIG. 1). In response, projector device 120 may receive augmenting image data representing the augmented reality effect and instructions for rendering the augmenting image data in conjunction with image content being projected by projector device 120. For example, augmenting image data may be effective to add highlighting image data to the low-pass content, to provide a soft "glow" around the depiction of the user when such augmenting image data is projected on the projection surface 130. Similarly, augmented image data may be added to high-frequency image data when sharp contrast is desired for the augmented image effect. In various examples, "low-contrast" and "high-contrast" augmented image data may be classified by computing a difference between the color and brightness of the particular augmented data when rendered on a display and other objects within the field of view. If the contrast value is calculated to be above a certain threshold, the augmented data may be considered "high-contrast" and may be projected using the raster projector 142. Similarly, if the contrast value is calculated to be below the threshold, the augmented data may be considered "low-contrast" and may be projected using a lamp-based projector, such as low-frequency projector 144. In various other examples, other quantifiable techniques may be used to categorize augmented reality data as low or high contrast. Irrespective of the method of categorization, augmented data classified as "high contrast" may be projected using raster projector 142 and augmented data classified as "low contrast" may be projected using a low frequency projector 144. Additionally, in some examples, augmented image data may be separated into different frequency bands and projected by different projectors of projector device 120, as described above. Further, in some examples, deep learning may be employed to create artistic images out of image data. For example, image data representing a photograph of an environment may be transformed such that the transformed image data resembles an oil-painting of the photograph when projected by projector device 120.

In other examples, the outline of a subject depicted may be highlighted with a bright color. Eye-glasses may be projected over the subject's eyes by augmenting the high-pass content 404. Such augmented and/or virtual image data may be added by processor 148 in accordance with instructions provided in memory 150 of projector device 120 (depicted in FIG. 1). In other examples, such augmented image data may be provided from a content server computing device to projector device 120 over network 104. The content server computing device may likewise provide instructions for projecting the augmented and/or virtual image data. Such instructions may indicate which projector (e.g., the raster projector or a particular frequency-band projector), or which combination of projectors, should be used to render the augmented image data, as well as a location of the augmented image data in relation to the original image data. Image effect filters may be applied to image data to alter the overall appearance of the image (e.g., to give the rendered image a "retro" feel).

Figure 5:
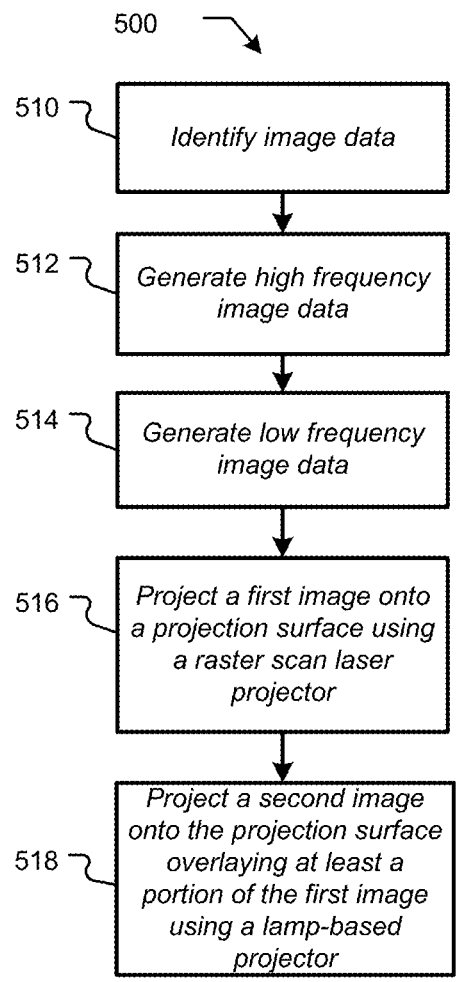
FIG. 5 depicts a flow chart showing an example process for projecting image data, in accordance with various aspects of the present disclosure.

FIG. 5 is a flow chart showing an example process for projecting image data, in accordance with various aspects of the present disclosure. The process flow 500 of FIG. 5 may be executed by projector device 120 and/or by a combination of projector device 120 and a computing device configured to be in communication with projector device 120, in accordance with various aspects of the present disclosure. The actions of process flow 500 may represent a series of instructions comprising computer-readable machine code executable by a processing unit of a computing device or of projector device 120 or by an image capture device, such as image capture device 116. In various examples, the computer-readable machine code may be comprised of instructions selected from a native instruction set of the computing device and/or an operating system of the computing device. Various actions in process flow 500 may be described with reference to elements of FIGS. 1-4.

At action 510 of process flow 500, projector device 120 may identify image data, such as image data received from image capture device 116 or from a computing device configured in communication with projector device 120 over a network.

Processing may continue from action 510 to action 512, "Generate high frequency image data." At action 512, the image data identified in step 510 may be filtered using a high-pass filter. Accordingly, image data with a frequency below the cutoff frequency of the high-pass filter may be attenuated. In the example depicted in FIG. 4, high-pass content 404 may be a visual representation of high frequency image data filtered from original image data represented by original image 402.

Processing may continue from action 512 to action 514, "Generate low frequency image data." At action 514, the image data identified in step 510 may be filtered using a low-pass and/or a band-pass filter. Image data with a frequency above the cutoff frequency of a low-pass filter may be attenuated. Similarly, image data with a frequency outside the pass-band of the band-pass filter may be attenuated. In the example depicted in FIG. 4, band-pass content 406 may be a visual representation of low frequency image data filtered from original image data represented by original image 402. Similarly, low-pass content 408 may be another visual representation of low frequency image data filtered from original image data represented by original image 402. Band-pass image data may be considered "low frequency" as it is of a lower frequency relative to image data generated by a high-pass image filter of projector device 120.

Processing may continue from action 514 to action 516, "Project a first image onto a projection surface using a raster scan laser projector." At action 516 a raster scan laser projector, such as raster projector 142 may project a first image onto the projection surface. The first image may correspond with the high frequency image data generated at action 512. In accordance with various embodiments of the present disclosure, projector device 120 may be effective to dynamically adjust the angle and/or distance between raster scan lines depending on the distance between the projector device 120 and the portion of the projection surface on which the particular scan line is to be projected. Additionally, the raster scan laser projector may emit infrared light that may be used to model the projection surface and to determine a distance between the projector device and various portions of the projection surface.

Processing may continue from action 516 to action 518, "Project a second image onto the projection surface overlaying at least a portion of the first image using a lamp-based projector." At action 518, a lamp-based projector, such as low-frequency projector 144 may project a second image onto the projection surface. The second image may correspond with the low frequency image data generated at action 514. The lamp-based projector may include a telecentric lens used for short-throw projection applications. Projector device 120 may be effective to overlay the first and second images such that the resulting overlapping image is a high quality depiction of the original image data.

Figure 6:
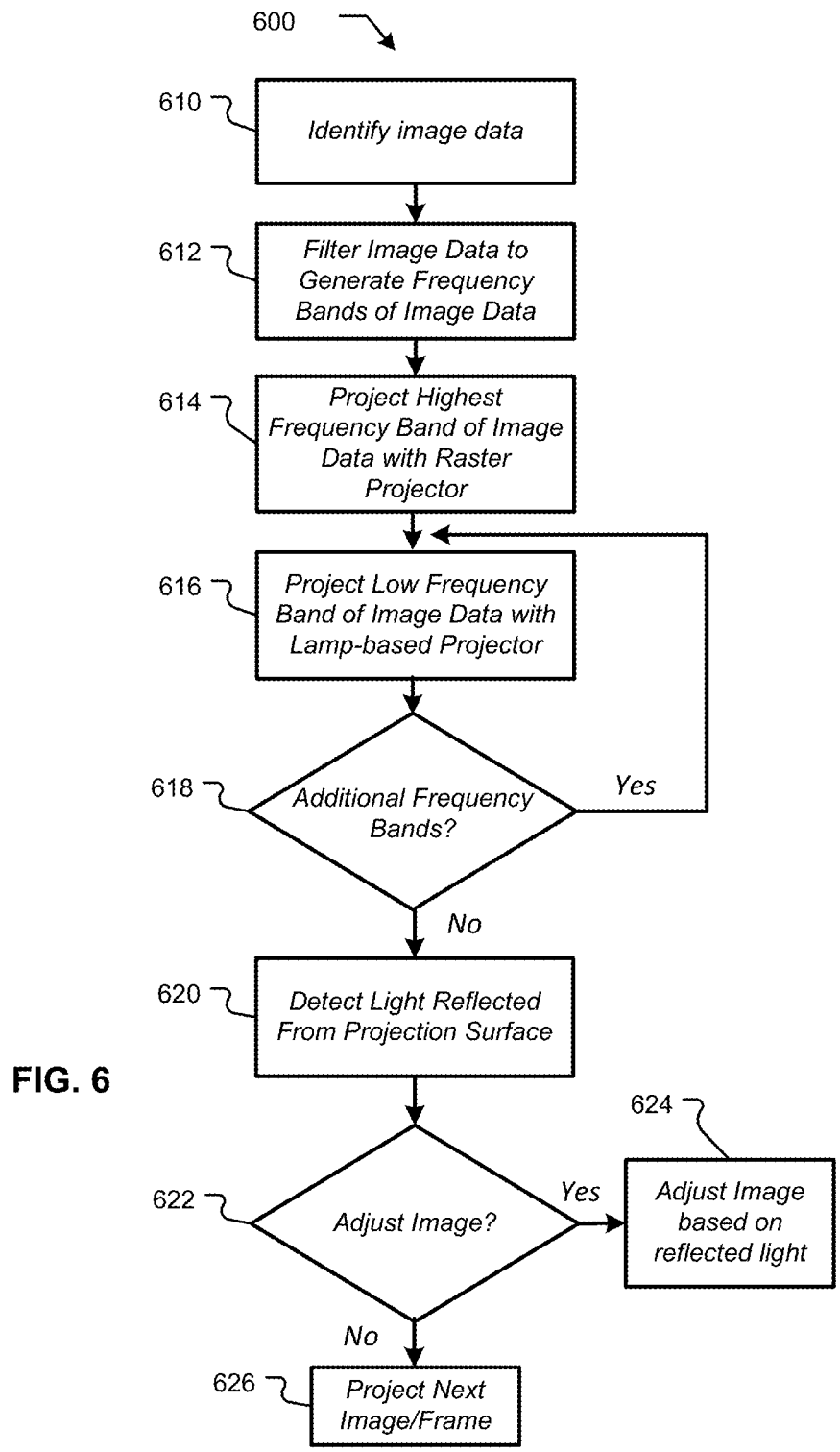
FIG. 6 depicts a flow chart showing an example process for projecting image data, in accordance with various aspects of the present disclosure.

FIG. 6 depicts a flow chart showing an example process for projecting image data, in accordance with various aspects of the present disclosure. The process flow 600 of FIG. 6 may be executed by projector device 120 and/or by a combination of projector device 120 and a computing device configured to be in communication with projector device 120, in accordance with various aspects of the present disclosure. The actions of process flow 600 may represent a series of instructions comprising computer-readable machine code executable by a processing unit of a computing device or of projector device 120 or by an image capture device, such as image capture device 116. In various examples, the computer-readable machine code may be comprised of instructions selected from a native instruction set of the computing device and/or an operating system of the computing device. Various actions in process flow 600 may be described with reference to elements of FIGS. 1-5.

At action 610 of process flow 600, projector device 120 may identify image data, such as image data received from image capture device 116 or from a computing device configured in communication with projector device 120 over a network.

Processing may continue from action 610 to action 612, "Filter image data to generate frequency bands of image data." For example, image filter unit 140 may include one or more high-pass, low-pass, and/or band-pass filters used to filter image data into various frequency ranges of the image data.

Processing may continue from action 612 to action 614, "Project highest frequency band of image data with raster projector." At action 614 a raster scan laser projector, such as raster projector 142 may project a the highest frequency range (or "band") of the filtered image data generated at action 612 onto the projection surface. In accordance with various embodiments of the present disclosure, projector device 120 may be effective to dynamically adjust the angle and/or distance between raster scan lines depending on the distance between the projector device 120 and the portion of the projection surface on which the particular scan line is to be projected. Additionally, the raster scan laser projector may emit infrared light that may be used to model the projection surface and to determine a distance between the projector device and various portions of the projection surface.

Processing may continue from action 614 to action 616, "Project low frequency band of image data with lamp-based projector." At action 616 a lamp-based projector, such as low-frequency projector 144 described in reference to FIG. 1, above, may project a different range of filtered image data apart from the highest frequency image data projected by the raster projector at action 614. For example, at action 616, a lamp-based projector may project filtered image data that has passed through a low-pass and/or a band-pass image filter of image filter unit 140.

Processing may continue from action 616 to action 618. At action 618 a determination may be made whether additional frequency bands are to be projected. In one example, a processor of projector device 120 (e.g., processor 148 depicted in FIG. 1) may determine whether additional frequency bands are to be projected. In another example, outputs of various high-pass, band-pass, and/or low-pass image filters of image filter unit 140 may be coupled to inputs of lamp-based projectors and/or raster projectors of projector device 120. If additional frequency bands or ranges of filtered image data are to be projected, processing may return from action 618 to action 616.

Conversely, if no frequency bands remain to be projected, processing may continue from action 618 to action 620, "Detect light reflected from projection surface." In some examples, infrared sensors may be used to detect infrared light reflected from projection surface 130. In some other examples, a camera, such as camera 152 discussed above in reference to FIG. 1, may be used to detect light reflected from projection surface 130. A processing unit of projector device 120 may use detected infrared light to model the projection surface 130 and/or to create a depth map of projection surface 130.

Processing may continue from action 620 to action 622 at which a determination is made whether or not to adjust the image. If a determination is made, for example by processor 148 or by a processing unit configured in communication with projector device 120, that no image adjustment is needed, processing may continue from action 622 to action 626. At action 626, the next image and/or image frame may be projected in accordance with the process flow described in FIG. 6.

If a determination is made that the image should be adjusted at action 622, processing may continue to action 624, "Adjust image based on reflected light." Projector device 120 may adjust light projected by one or more raster projectors and/or lamp-based projectors based on the depth map or other model of projection surface 130. For example, projector device 120 may adjust the dimensions and/or angles of projected light to account for irregularities or non-uniformities in projection surface 130 such that the projected image resembles image data stored in a memory of projector device 120. Furthermore, in some examples, camera 152 may compare color values of the light reflected from projection surface 130 to color values of the currently projected image data that are stored in memory (e.g., memory 150 from FIG. 1). If projector device 120 determines that there is a discrepancy between one or more color values reflected from projection surface 130 and the corresponding color values stored in memory, projector device 120 may adjust the color values projected until the color values of reflected light match the expected color values stored in memory. Accordingly, projector device 120 may account for different colored projection surfaces and for ambient light affecting the color of the projected images.

Among other potential benefits, a system in accordance with the present disclosure may allow for a small form factor, low power consumption, short throw projector device. Filtering image data into various frequency bands and using a raster laser projector to project high frequency image data may allow for reduced power consumption relative to using lamp-based projection for high-frequency image data, while providing equivalent image quality. Additionally, using a raster projector may reduce the size of the form factor of the projector device allowing for a smaller and more portable display system. Using infrared and ambient light sensors allows the projector device to detect and correct for ambient conditions such as projection surface coloring, geometry, microgeometry, reflectiveness, ambient light, etc. Further, augmented effects may be added to the projected image. Additionally, since the raster laser projector can emit infrared light, no separate infrared light source need be added in order to detect various conditions related to the projection surface and/or the surrounding environment. In some further examples, infrared sensors may use time-of-flight technology to determine the distance that various scan lines need to be projected from the raster projector to reach the projection surface. Angles of emission between raster scan lines may be dynamically adjusted in order to account for divergence of raster scan over the throw of the projector to ensure that a uniform and high quality image is projected onto the projection surface. Various frequency bands of the projector device may be overlaid on the projection surface to recreate the original image. Alignment calibration and computer vision techniques may be used to align the different frequency bands of the image when projected on the projection surface.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A short-throw display system, comprising:
   at least one processor effective to:
   receive image data;
   filter the image data with a high-pass filter to produce first frequency range image data corresponding to a first frequency range;
   filter the image data with a low-pass filter to produce second frequency range image data corresponding to a second frequency range, wherein the second frequency range image data comprises lower frequencies relative to frequencies of the first frequency range image data;
   a laser projector effective to receive the first frequency range image data and to project a first image onto a projection surface with laser light in a raster scanning pattern; and
   a lamp-based projector effective to receive the second frequency range image data and to project a second image onto the projection surface at least partially aligned with the first image;
   wherein the short-throw display system comprises a throw ratio of 0.4:1 or greater.

2. The short-throw display system of claim 1, further comprising:
an infrared depth sensor effective to detect infrared laser light reflected from the projection surface; and
wherein the at least one processor is effective to generate a depth map of the projection surface based at least in part on the infrared laser light, wherein the depth map indicates a non-uniform element of the projection surface, and the laser projector is effective to adjust the first image to compensate for the non-uniform element of the projection surface.

3. The short-throw display system of claim 1, wherein the at least one processor is effective to filter the image data with a band-pass filter to produce third frequency range image data corresponding to a third frequency range, wherein the third frequency range comprises frequencies between the first frequency range and the second frequency range, the system further comprising:
a second lamp-based projector effective to receive the third frequency range image data and to project a third image onto the projection surface at least partially aligned with the first image.

4. A display system, comprising:
an image filter unit effective to filter image data into at least first frequency range image data corresponding to a first frequency range and second frequency range image data corresponding to a second frequency range, wherein the first frequency range comprises higher frequencies relative to the second frequency range;
a laser projector effective to receive the first frequency range image data and to project a first image onto a projection surface using a raster-based technique, wherein the first image corresponds to the first frequency range image data;
a lamp-based projector effective to receive the second frequency range image data and to project a second image onto the projection surface, wherein the second image at least partially aligns with the first image and corresponds to the second frequency range image data; and
wherein the display system comprises a throw ratio of 0.4:1 or greater.

5. The display system of claim 4, further comprising:
an infrared sensor; and
at least one processor programmed to:
cause the laser projector to emit infrared light toward the projection surface;
cause the infrared sensor to detect a portion of the infrared light reflected from the projection surface; and
generate a depth map of the projection surface based at least in part on the portion of the infrared light reflected from the projection surface.

6. The display system of claim 4, wherein a first image filter of the image filter unit comprises a high-pass filter and a second image filter of the image filter unit comprises a low-pass filter.

7. The display system of claim 6, wherein a third image filter of the image filter unit is effective to filter image data into third frequency range image data corresponding to a third frequency range, wherein the third frequency range comprises frequencies between the first frequency range and the second frequency range, the system further comprising:
a third projector effective to receive the third frequency range image data and to project a third image onto the projection surface, wherein the third image at least partially aligns with the first image.

8. The display system of claim 4, wherein the lamp-based projector comprises a telecentric lens with a first field of view that at least partially overlaps with a second field of view of the laser projector.

9. The display system of claim 4, further comprising:
a camera effective to detect light reflected from the projection surface; and
at least one processor effective to:
determine a first color value of the light reflected from the projection surface;
compare the first color value of the light to a second color value of image data stored in a memory; and
adjust a third color value of the first image based at least in part on a difference between the first color value and the second color value.

10. The display system of claim 4, wherein the lamp-based projector comprises a lamp and is configured to project the second image using light emitted from the lamp.

11. The display system of claim 4, further comprising:
at least one processor;
an infrared sensor; and
a scanning mirror;
wherein the at least one processor is effective to:
determine a first distance between the laser projector and a first position on the projection surface where a first raster scan line is projected, where the first distance is determined based at least in part on first light reflected from the first position on the projection surface and detected by the infrared sensor;
determine a second distance between the laser projector and a second position on the projection surface where a second raster scan line is projected, where the second distance is determined based at least in part on second light reflected from the second position on the projection surface and detected by the infrared sensor;
determine that the second distance is greater than the first distance; and
control the scanning mirror to decrease a projection angle between the projection of the first raster scan line and the second raster scan line.

12. The display system of claim 4, wherein:
at least one of the laser projector and the lamp-based projector is further effective to receive second image data, wherein the second image data comprises an image effect configured to augment at least a portion of one or more of the first image or the second image; and
at least one of the laser projector and the lamp-based projector is effective to project the second image data in conjunction with the first image and the second image.

13. A method comprising:
identifying image data;
generating first image data of a first frequency range from the image data;
generating second image data of a second frequency range from the image data, wherein the first frequency range is higher than the second frequency range;
projecting a first image onto a projection surface with a laser projector using a raster-based technique, wherein the first image corresponds to the first image data; and
projecting a second image onto the projection surface aligned with least a portion of the first image, wherein projecting the second image onto the projection surface is performed using a lamp-based projector, and wherein the second image corresponds to the second image data, wherein the laser projector and the lamp-based projector each comprise a throw ratio of 0.4:1 or greater.

14. The method of claim 13, further comprising:

emitting light toward the projection surface;

detecting a portion of the light reflected from the projection surface with a depth sensor; and generating a depth map of the projection surface based at least in part on the portion of the light reflected from the projection surface.

15. The method of claim 13, further comprising:

filtering the image data with a high-pass filter to generate the first image data of the first frequency range; and filtering the image data with one or more of a low-pass filter or a band-pass filter to generate the second image data.

16. The method of claim 15, further comprising:

filtering the image data with a second band-pass filter to generate third image data; and projecting a third image onto the projection surface, wherein the projected third image is at least partially aligned with the first image and the second image, wherein the projected third image corresponds to the third image data.

17. The method of claim 13, further comprising:

detecting light reflected from the projection surface with a light sensor;

determining a first color value of the light reflected from the projection surface;

comparing the first color value of the light to a second color value of the image data stored in a memory; and adjusting a third color value of the first image or the second image based at least in part on a difference between the first color value and the second color value.

18. The method of claim 13, further comprising:

determining a first distance between the laser projector and a first position on the projection surface where a first raster scan line is projected, where the first distance is determined based at least in part on first infrared light reflected from the first position on the projection surface and detected by an infrared sensor;

determining a second distance between the laser projector and a second position on the projection surface where a second raster scan line is projected, where the second distance is determined based at least in part on second infrared light reflected from the second position on the projection surface and detected by the infrared sensor;

determining that the second distance is greater than the first distance; and adjusting a projection angle of the laser projector to maintain a substantially uniform distance between consecutive raster scan lines projected on the projection surface.

19. The method of claim 13, further comprising:

identifying second image data, wherein the second image data comprises an image effect configured to augment at least a portion of one or more of the first image or the second image;

receiving an instruction to add the second image data to the image data; and projecting an augmented effect corresponding to the second image data in conjunction with the first image and the second image.

* * * * *